US007974768B2

(12) United States Patent
Cordesses et al.

(10) Patent No.: US 7,974,768 B2
(45) Date of Patent: Jul. 5, 2011

(54) DEVICE FOR CONTROLLING AN INTERNAL COMBUSTION ENGINE

(75) Inventors: Lionel Cordesses, Velizy Villacoublay (FR); Didier Martinez, Ecquevilly (FR)

(73) Assignee: RENAULT s.a.s., Boulogne Billancourt (FR)

( * ) Notice: Subject to any disclaimer, the term of this patent is extended or adjusted under 35 U.S.C. 154(b) by 835 days.

(21) Appl. No.: 11/719,559

(22) PCT Filed: Nov. 18, 2005

(86) PCT No.: PCT/FR2005/050965
§ 371 (c)(1),
(2), (4) Date: Jan. 22, 2008

(87) PCT Pub. No.: WO2006/054029
PCT Pub. Date: May 26, 2006

(65) Prior Publication Data
US 2009/0153337 A1    Jun. 18, 2009

(30) Foreign Application Priority Data
Nov. 18, 2004 (FR) .................................... 04 12252

(51) Int. Cl.
*F02D 17/00* (2006.01)
*G06F 17/00* (2006.01)
*G01M 15/00* (2006.01)
(52) U.S. Cl. ..................... 701/111; 73/35.05; 73/114.16; 702/140; 702/190; 702/193; 702/197
(58) Field of Classification Search .......... 701/101–104, 701/111, 114–115; 123/435, 436, 406.26, 123/406.29, 406.34–406.36; 73/114.16, 73/35.05; 702/57, 66, 70, 138, 182, 183, 185, 189–197, 50, 140
See application file for complete search history.

(56) References Cited

U.S. PATENT DOCUMENTS

| 2,931,901 | A |   | 4/1960 | Markusen |
| 3,654,563 | A |   | 4/1972 | Hesler et al. |
| 4,035,734 | A | * | 7/1977 | Flormann et al. ............. 327/552 |
| 6,598,468 | B2 | * | 7/2003 | Zur Loye et al. .......... 73/114.06 |
| 7,130,738 | B2 | * | 10/2006 | Ha ................................. 701/114 |

(Continued)

FOREIGN PATENT DOCUMENTS
JP       2 385 100      10/1978

*Primary Examiner* — Willis R Wolfe, Jr.
*Assistant Examiner* — Johnny H Hoang
(74) *Attorney, Agent, or Firm* — Oblon, Spivak, McClelland, Maier & Neustadt, L.L.P.

(57) ABSTRACT

(EN) The invention concerns a device for controlling an internal combustion engine (601), comprising means (600) for generating a signal for controlling the internal combustion engine (601), a sensor (602) for supplying a pressure measurement signal of a combustion chamber of the internal combustion engine (601), and a filtering device (603) for generating a filtered pressure signal, said filtering device (603) being made from analog electronic components. The invention is characterized in that the filtering device (603) has a closed loop configuration with a direct portion (201, 202, 203, 204) and a return portion (205), the return portion comprising a module for re-injecting (205) said filtered pressure signal (P) and the direct portion including: a first subtracting module (201) generating the difference between said pressure measurement signal ($P_r$) and the output of said re-injection module (205), a static non-linear module (202) in output of said subtracting module, an integrating module (204) generating said filtered pressure signal (P) by integration from the output of said non-linear module.

11 Claims, 5 Drawing Sheets

U.S. PATENT DOCUMENTS

| | | |
|---|---|---|
| 7,212,912 B2 * | 5/2007 | Okubo et al. ................. 701/114 |
| 7,246,005 B2 * | 7/2007 | Johnson ........................ 701/111 |
| 7,444,234 B2 * | 10/2008 | Bauerle ......................... 701/114 |
| 2003/0010101 A1 * | 1/2003 | Zur Loye et al. ............... 73/116 |
| 2008/0091393 A1 * | 4/2008 | Gustafsson ....................... 703/5 |

* cited by examiner

DEVICE FOR CONTROLLING AN INTERNAL COMBUSTION ENGINE

BACKGROUND

The invention relates to a device for controlling an internal combustion engine.

Figure 1A:
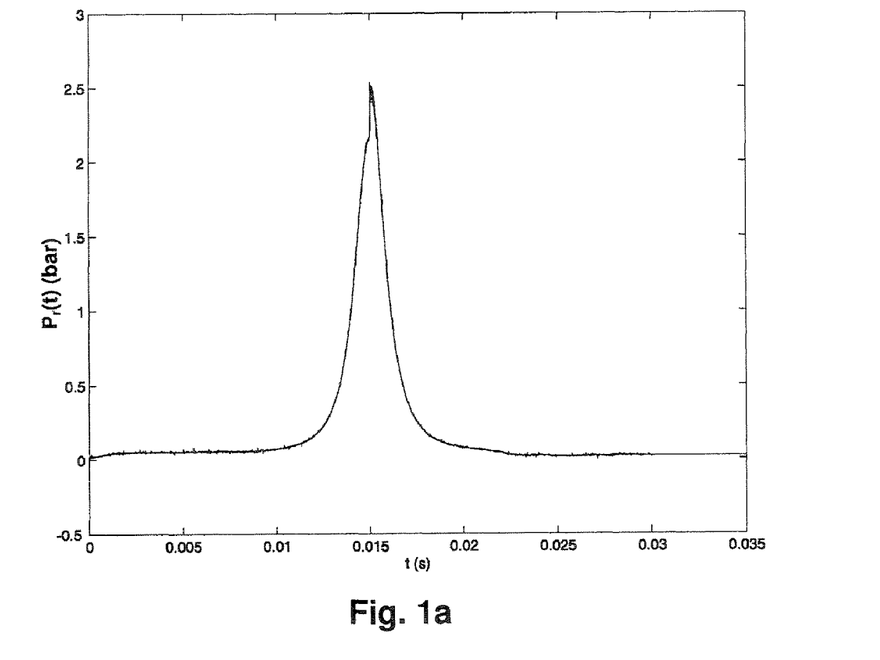
Figure 1B:
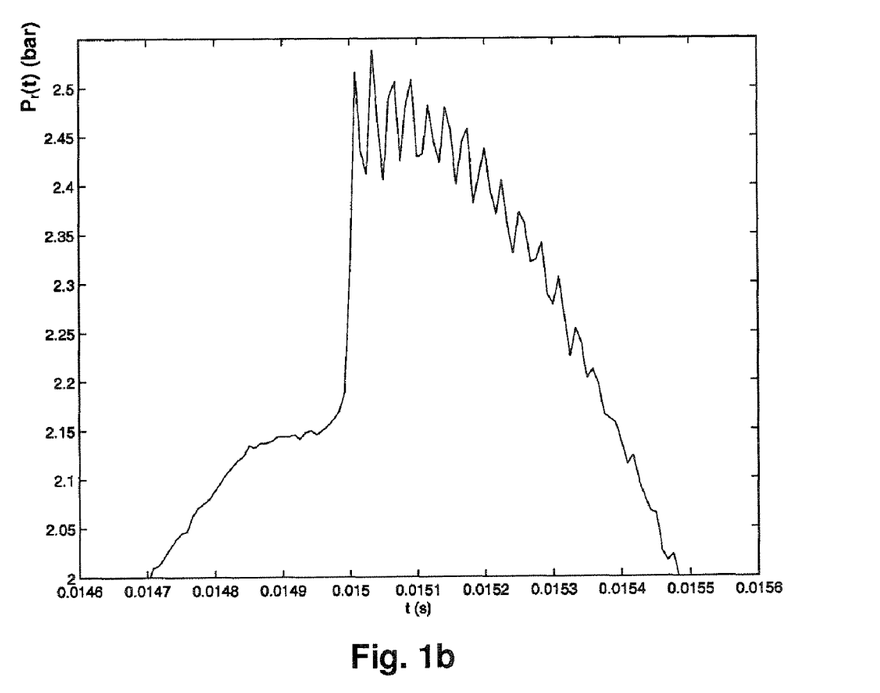

In the field of motor vehicles it is important to be able to have precise control over the combustion phase of the thermodynamic cycle of these engines. To do that, it is commonplace to measure the pressure in the combustion chamber and, on the basis of this measurement, to determine a certain number of characteristic parameters, particularly parameters that can be used for feedback control of the engine. These parameters are, for example, the combustion start time, the power of acoustic emissions from the engine, or the power supplied by the engine. However, the pressure signal obtained by measurement in a combustion chamber cannot be used without prior processing because it exhibits measurement noise in the form of parasitic fluctuations. An example of such a raw pressure signal p(t) measured in a combustion chamber of a car engine is depicted as a function of time in FIG. 1A, FIG. 1B being an enlarged detail of the signal depicted in FIG. 1A, this detail corresponding to the start of combustion. The fluctuations present on such a signal do not correspond to variations in the pressure in the combustion chamber but are due to parasitic mechanical fluctuations. The measured pressure signal must therefore be filtered before it can be used to determine parameters that can be used for feedback control.

Simple solutions involving linear filtering allow the undesirable fluctuating components in the pressure signal to be reduced. However, this type of filtering has the disadvantage of also attenuating the frequency component, located at around 10 kHz, which corresponds to a sharp increase in the pressure at the start of combustion (in FIG. 1A or 1B, this sharp increase occurs at around t=0.015). Precise detection of the start of combustion is therefore in particular not possible with such a method.

Other known solutions rely on the use of wavelet transforms. Hence, patent application US 2003/0 145 829 A1 describes a method allowing the start of combustion to be detected in a combustion chamber from a measurement of the pressure obtaining in this chamber. The pressure signal is filtered by applying a wavelet transform. The start of combustion is detected by analyzing the wavelet coefficients thus obtained, in that it manifests itself in an abrupt jump in the absolute value of the wavelet coefficients.

Another source, patent application EP 1 209 458 A1 describes a method for determining the level of noise relative to the combustion noise of an internal combustion engine. The measured pressure signal is also filtered by wavelet transforms. The energy of the starting time-based signal may, on the basis of Parseval's theorem, be estimated from the wavelet coefficients obtained and it is possible from this to deduce the noise level. This noise level can be used as a feedback control parameter for an engine combustion control module.

However, these methods provide only partial solutions to the problem that is that of determining the parameters needed for controlling combustion. These methods are not, in particular, able to calculate directly and accurately the apparent energy release, as defined by the following relationship:

$$\left.\frac{dQ}{dt}\right|_t = \frac{1}{\gamma-1} V(t) \left.\frac{dP}{dt}\right|_t + \frac{\gamma}{\gamma-1} P(t) \left.\frac{dV}{dt}\right|_t \quad (1)$$

where γ is the ratio of the specific heat capacities of the combustion gases (the ratio of the specific heat capacity at constant pressure to the specific heat capacity at constant volume), V(t) is the volume of the combustion chamber, P(t) is the pressure in the combustion chamber and t is the time. To this end, it is therefore necessary, the volume of the combustion chamber being known, to be able to determine the instantaneous pressure actually obtaining in the combustion chamber and the derivative of this pressure with respect to time and therefore to greatly reduce or eliminate the parasitic fluctuations contained in the measured pressure signal usually available.

French patent application FR 04 07060 itself describes a method for processing a measured pressure signal from a combustion chamber of an internal combustion engine using a wavelet-based filtering technique and nonlinear filtering functions and able to yield a filtered pressure signal which is suitable for determining parameters such as the apparent energy release or the combustion start time. This method does, however, entail an embodiment based on a digital processor of the DSP type or based on an ASIC (application-specific integrated circuit) and is therefore a relatively expensive embodiment.

BRIEF SUMMARY

It is therefore an object of the invention to provide a device for processing a measured pressure signal from a combustion chamber that does not exhibit the disadvantages of the anterior solutions just described, is able to yield a filtered pressure signal suitable for determining parameters such as the apparent energy release or the combustion start time and also has a low cost of embodiment.

This problem is solved according to the invention by a device for controlling an internal combustion engine, comprising means for generating a signal for controlling the internal combustion engine, a sensor for supplying a measured pressure signal for the pressure measured in a combustion chamber of the internal combustion engine, and a filtering device for generating a filtered pressure signal, said filtering device being produced from analog electronic components, characterized in that the filtering device has a closed-loop configuration with a direct part and a return part, the return part comprising a reinjection module for reinjecting said filtered pressure signal and the direct part of the loop comprising:
  a first subtractor module generating the difference between said measured pressure signal and the output from said reinjection module,
  a static nonlinear module on the output side of said subtractor module,
  an integrator module generating said filtered pressure signal by integrating the output of said nonlinear module.

According to one particularly advantageous embodiment, the device according to the invention further comprises:
  a second subtractor module generating the difference between said measured pressure signal and said filtered pressure signal,
  a low-pass filtering module on the output side of said second subtractor module,
  an adder module generating a corrected filtered pressure signal in the form of the sum of said filtered pressure signal and the output from said low-pass filtering module.

The device according to the invention may further exhibit one or more of the following advantageous features:

the signal input into the integrator module is, disregarding the gain factor, the signal corresponding to the derivative with respect to time of the filtered pressure signal;

the device comprises at least one multiplier module for adjusting the gain applied to said filtered pressure signal before it is reinjected;

the function performed by said nonlinear module is a soft or hard thresholding function;

said nonlinear module is made from at least one resistor and at least two diodes which are connected back-to-back and in parallel;

said first subtractor module or the second subtractor module or the adder module is made from an operational amplifier and at least one resistor;

said integrator module is made from at least one resistor and one capacitor;

said low-pass filtering module is made from at least one resistor and one capacitor.

BRIEF DESCRIPTION OF THE DRAWINGS

Other features and advantages of the invention will become apparent from the detailed description which will follow. In the appended drawings to which reference is made:

FIG. 1a, already described, depicts an example of a pressure signal measured in a combustion chamber, FIG. 1b, already described, depicts a detail of the signal depicted in figure 1a, FIG. 2a depicts a block diagram of a first exemplary embodiment of the filtering device of an engine control device according to the invention.

DETAILED DESCRIPTION

Figure 5:
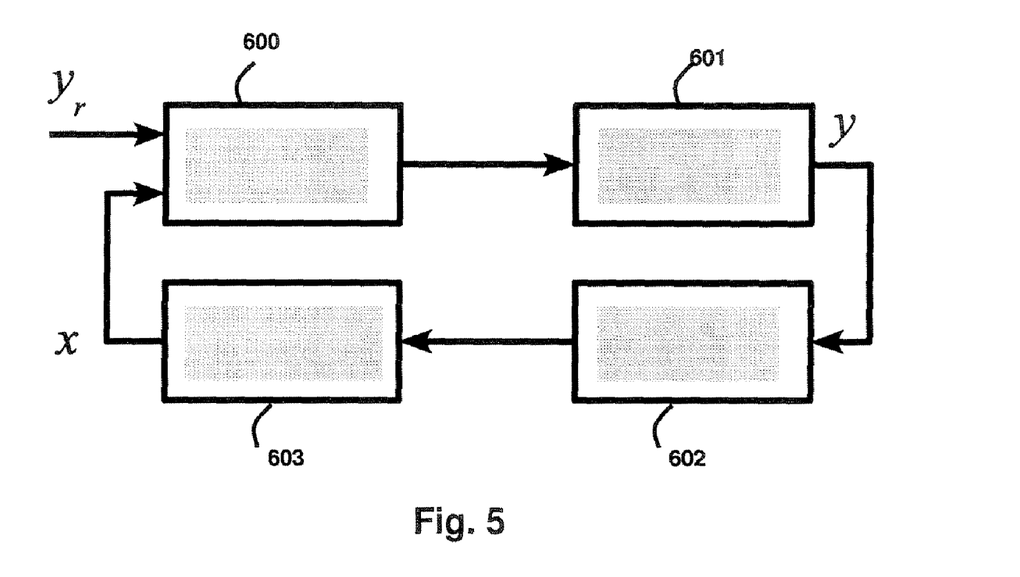
FIG. 5 depicts a block diagram of the engine control device of the invention using feedback control.

FIG. 5 depicts a device for controlling an engine 601 controlled by a unit 600 corresponding to means for controlling the engine 601 generating a control signal Com. The pressure in the combustion chamber of the engine is measured by a sensor 602. The analog signal generated there by the sensor is transmitted to a filtering device 603 according to the invention. The control means 600 are typically used as computation means of a motor vehicle computer intended to control the combustion of the vehicle engine. In this case, the signals from the filtering device 603 are digitized before being injected into the control module 600.

Figure 2A:
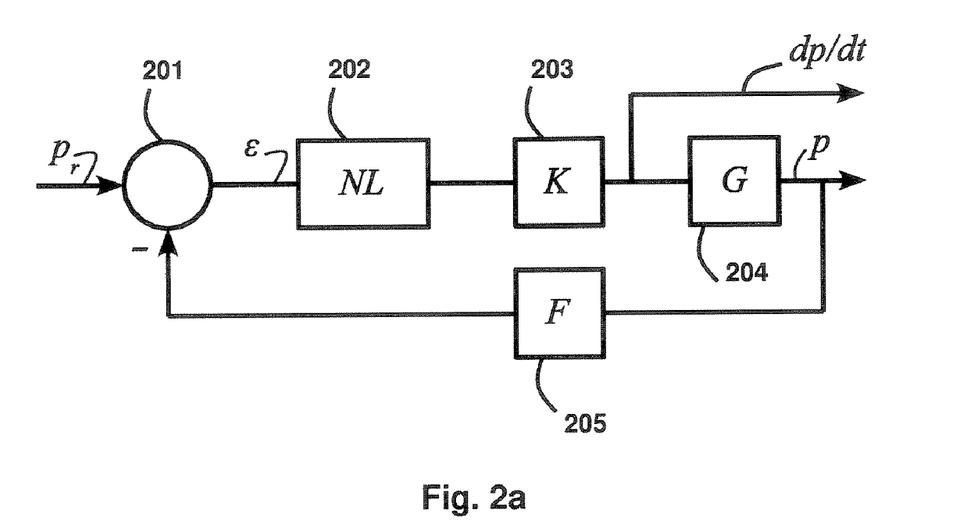

FIG. 2a depicts a block diagram of a first exemplary embodiment of the filtering device of the control device according to the invention. As will be described in greater detail, each of the modules used is made from analog electronic components. The filtering device comprises a closed-loop configuration with at least one direct filtering branch and at least one return branch allowing the filtered pressure signal to be reinjected. The raw measured pressure signal $P_R$, which signal comes from a measurement sensor positioned in the combustion chamber is input into the filtering device.

In this first exemplary embodiment, the filtering device according to the invention comprises a direct branch, comprising, in series:

a first subtractor module 201,
a nonlinear static module 202,
a multiplier module 203, and
an integrator module 204 generating the filtered pressure signal P.

The filtering device according to the invention comprises a return branch formed by a reinjection module 205 allowing the filtered pressure signal p available on the output side of the integrator module 204 to be reinjected into the first subtractor module 201.

The first subtractor module 201 generates a difference signal $\epsilon$ corresponding to the difference between the measured pressure signal $P_R$ and the filtered pressure signal P. This pressure difference signal $\epsilon$ undergoes a nonlinear operation by means of the nonlinear module 202. The purpose of this nonlinear module is to attenuate the low-amplitude fluctuations contained in the difference signal $\epsilon$. The nonlinear function NL is preferably a soft thresholding or hard thresholding function.

The soft thresholding function NL(x) is mathematically defined by:

$$\begin{cases} NL(x) = x - \sigma & \text{if } x > \sigma \\ NL(x) = 0 & \text{if } -\sigma < x < \sigma \\ NL(x) = x + \sigma & \text{if } x < -\sigma \end{cases}$$

The hard thresholding function NL(x) is mathematically defined by:

$$\begin{cases} NL(x) = x & \text{if } x > \sigma \\ NL(x) = 0 & \text{if } -\sigma < x < \sigma \\ NL(x) = x & \text{if } x < -\sigma \end{cases}$$

After the nonlinear operation, the filtered pressure difference signal is optionally adjusted by a multiplier module 203 which applies a gain K to the signal output from the nonlinear module 202 before it is injected into an integrator module 204 the function of which is to generate, at output, a signal representing the integration with respect to time of the filtered pressure difference signal. The output from the integrator module 204 which is formed by the filtered pressure signal p is reinjected via the reinjection module 205 into the first subtractor module 201 on the input side of the filtering device. The Laplace transfer function F(s) applied by the reinjection module 205 is preferably F(s)=1, applied as a simple unit gain or a simple looping back.

The multiplier module 203 has been depicted in FIG. 2a on the input side of the integrator module; however, it could equally be placed on the output side of the integrator module or be placed in the return branch on the input side of the reinjection module. The gain may also, depending on the embodiments chosen for the various modules 202, 203, 204 or 205, equally be incorporated into one of these modules. The essential feature is, as is known, for the static gain of the open-loop transfer function of the filtering device and that of the return branch to be adjusted so that the cutoff frequencies of the nonlinear filter meet the specifications.

Because of the succession of connected modules in the direct branch and because of the closed-loop configuration with reinjection of the filtered pressure signal P on the output side of the integrator, the signal input into the integrator module 204 corresponds, disregarding the gain factor, to the derivative of the filtered pressure signal. As a result, there is no need to use additional means other than those of the filtering device generating the filtered pressure signal for generating the derivative of the filtered pressure signal. This makes the circuit configuration according to the invention particularly advantageous and simple.

Figure 2B:
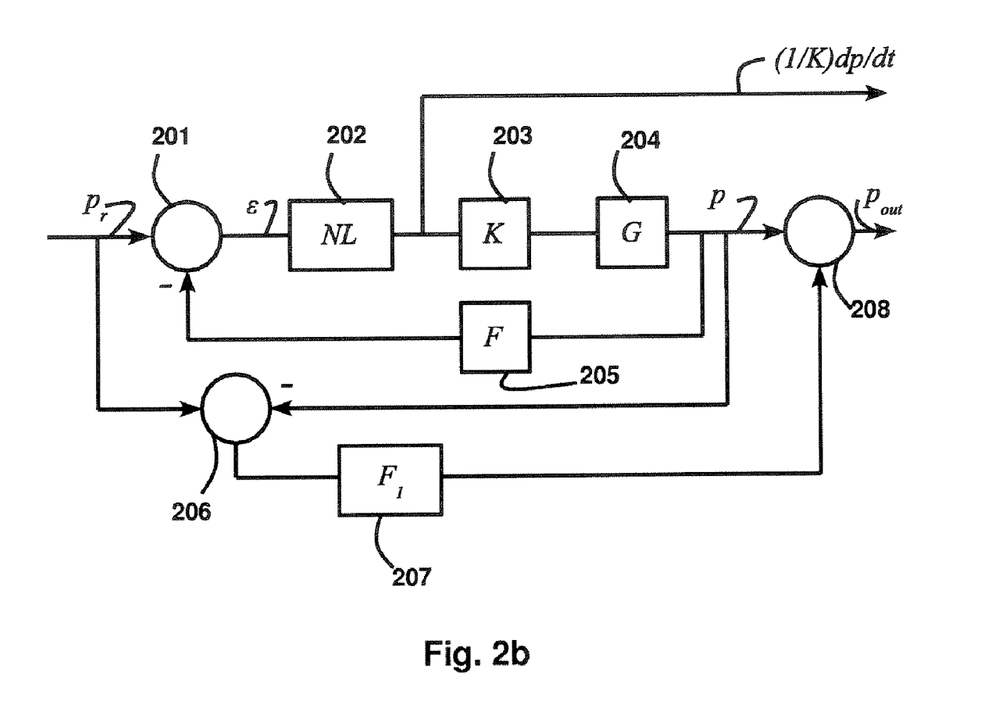
FIG. 2b depicts a block diagram of a second exemplary embodiment of the filtering device of the engine control device according to the invention.

FIG. 2b is a block diagram of a second embodiment of the filtering device of the device for controlling an engine 601 according to the invention. The modules 201 to 205 are identical to those of the first embodiment and are connected in the same way. In addition, this embodiment comprises a subtractor module 206 that calculates the difference between the measured pressure signal $P_r$ input to the filtering device and the filtered pressure signal output from the integrator module 204. The difference signal is obtained on the output side of the subtractor module 206 and is filtered by means of a low-pass filter $F_1$ 207. The difference between the filtered pressure signal P on the output side of the integrator module 204 and the output signal from the low-pass filter is calculated using an adder module 208 which generates a corrected filtered pressure signal $P_{out}$ in the form of the sum of said filtered pressure signal P and the output from said low-pass filtering module 207. This second embodiment through the presence of the elements 206, 207 and 208, makes it possible to compensate for the voltage shift introduced by the nonlinear function of the nonlinear module 202. Such a correction is not, however, strictly indispensable if the shift on the filtered pressure signal does not impede the processing operations that will be applied to the filtered pressure signal. The first embodiment will be chosen over the second embodiment in all instances where simplicity of embodiment are required.

Exemplary embodiments of the modules 201, 202, 204, 206, 207 for the first and second embodiment are given in FIGS. 3a to 3d.

Figure 3A:
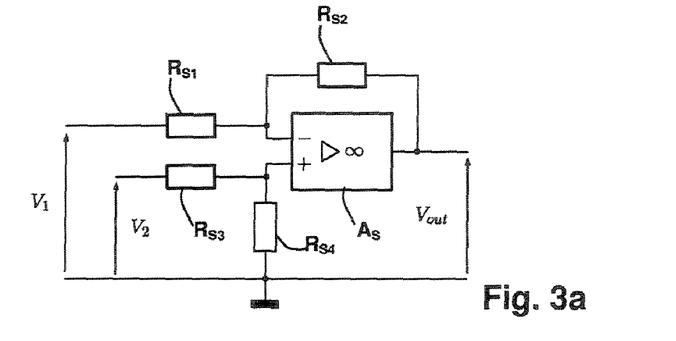
FIGS. 3a to 3d depict exemplary embodiments of various modules of the filtering device of the engine control device according to the invention.

FIG. 3a provides an exemplary embodiment of a subtractor module 201 or 206. In this embodiment, the subtractor module is made from an operational amplifier $A_s$ and four resistors $R_{S1}$, $R_{S2}$, $R_{S3}$, $R_{S4}$ for adjusting the gain across the inputs $V_1$, $V_2$ of the subtractor module. Its transfer function is given by the following relationship:

$$V_{out} = \frac{R_{S2}}{R_{S1}}(V_2 - V_1) \text{ if } R_{S1} = R_{S3} \text{ and } R_{S2} = R_{S4}.$$

Other embodiments of the subtractor module involving more or fewer resistors or other basic analog components are also conceivable.

Figure 3B:
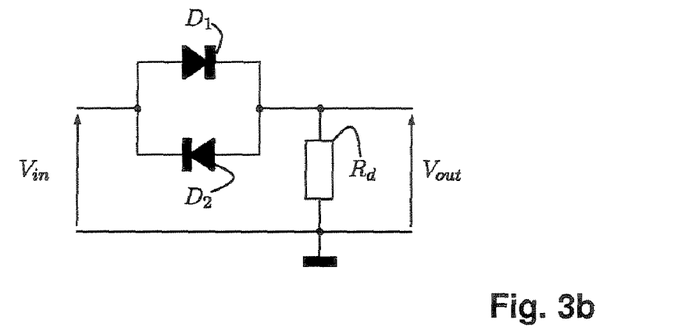
Figure 4:
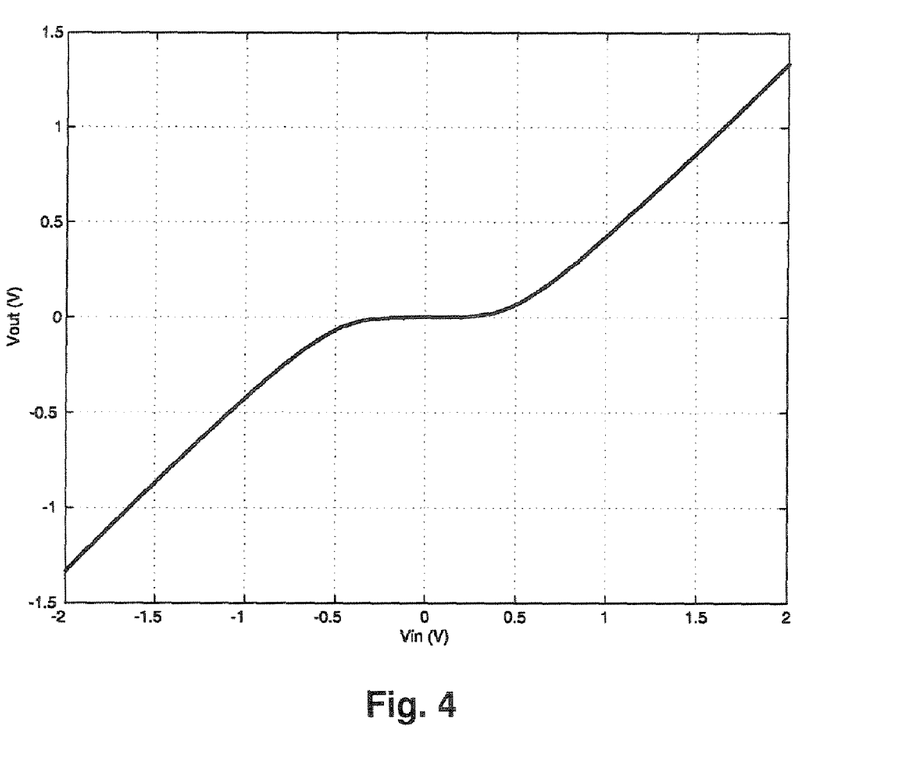
FIG. 4 depicts the appearance of the function performed by the module of FIG. 3b.

FIG. 3b gives an embodiment of a nonlinear module 202. In this embodiment, which is simple but none the less exhibits a good cost/performance trade off, the nonlinear module 202 is made from a resistor $R_D$, for adjusting the output gain of the module, and two diodes $D_1$ and $D_2$ connected in parallel and back-to-back. The assembly formed by the two diodes in parallel is placed in series with the resistor $R_D$, the input voltage being connected across the terminals of this series configuration. The output voltage $V_{out}$ is picked off the terminals of the resistor $R_D$. FIG. 4 illustrates the transfer function obtained using such an embodiment. This here is a soft thresholding function. This solution has the advantage of being very simple and inexpensive. A more complicated embodiment, for example allowing a hard thresholding function to be performed, is also conceivable.

Figure 3C:
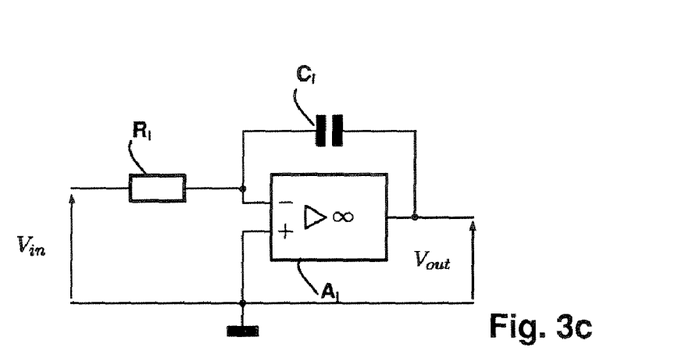

FIG. 3c gives an embodiment of an integrator module 204. In this embodiment, the integrator module 204 is made from an operational amplifier $A_I$, a resistor $R_I$ and a capacitor $C_I$. Other embodiments with more or fewer resistors or other basic analog components are also conceivable. The Laplace transfer function for such an integrator module is generally of the type $$G(s) = -\frac{1}{R_I C_I s}.$$

A passive integrator the transfer function of which is $$G(s) = \frac{k}{1 + \tau s},$$

where τ is a time constant, is also conceivable. Embodiments of the first type of transfer function are generally less expensive because, unlike embodiments of the second type, they do not require a follower module for integrator module impedance matching.

Figure 3D:
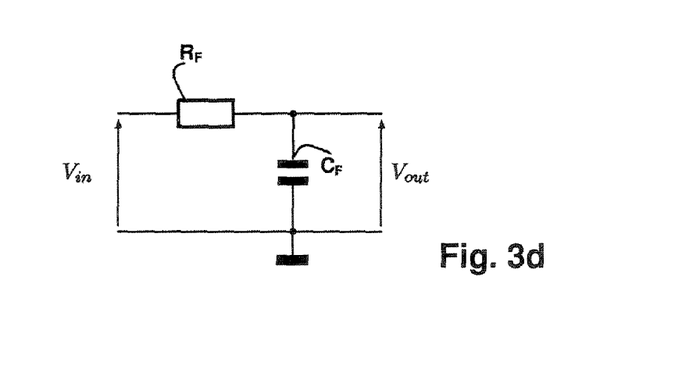

FIG. 3d gives an embodiment of a low-pass filtering module 207. In this embodiment, the low-pass filtering module is made in the form of a first order low-pass filter, from a resistor $R_F$ and a capacitor $C_F$. Its Laplace transfer function is $$F(s) = \frac{1}{1 + R_F C_F s}$$

Other embodiments with more resistors or capacitors are also conceivable. Any embodiment able to yield a low-pass filter is likely to be suitable, particularly higher order filters.

Figure 6:
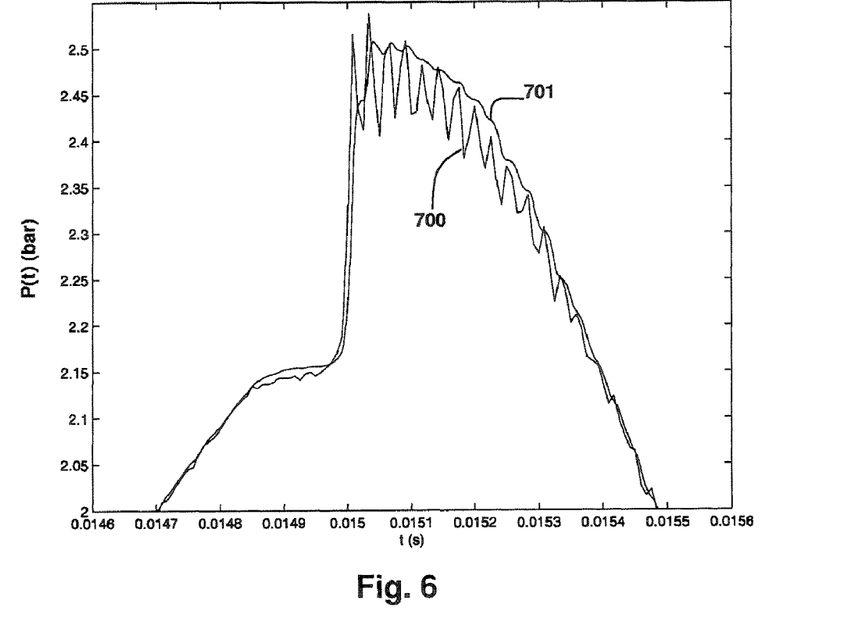
FIG. 6 depicts the appearance of the pressure signal with and without the filtering according to the invention being applied.
Figure 7:
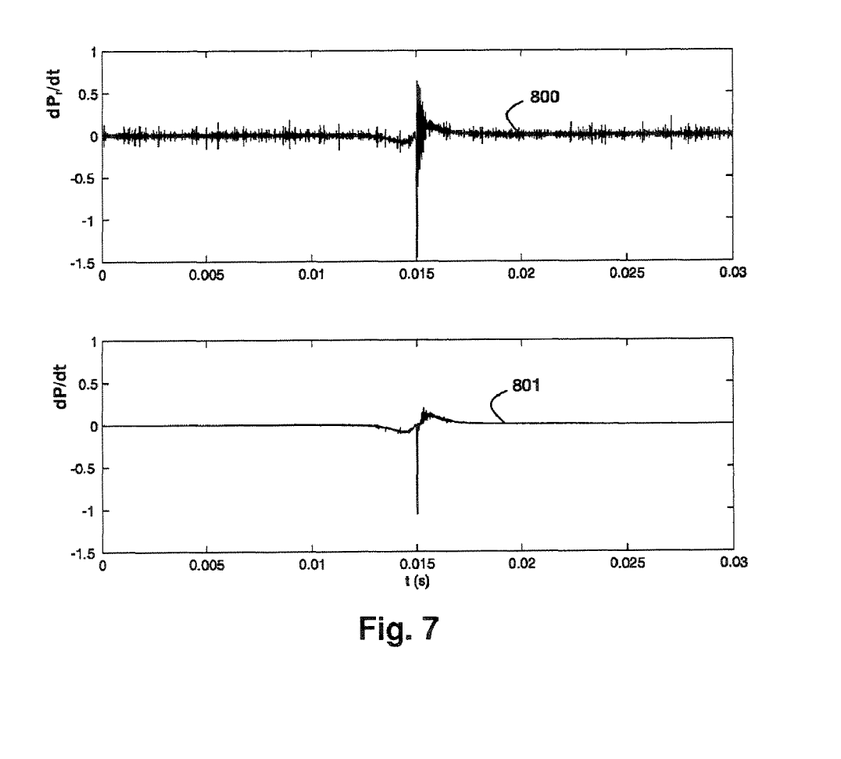
FIG. 7 depicts the appearance of the derivative of the pressure signal of FIG. 6 with and without the filtering according to the invention being applied to the pressure signal.

FIGS. 6 and 7 respectively illustrate the appearance as a function of time t of the raw pressure signal $P_R$ 700 and filtered pressure signal P 701 and the appearance of the derivative of these same signals $dP_R/dt$ 800 and $dP/dt$ 801. The effectiveness of the filtering device can be observed at the same time as can the ability of this device to keep intact the steep rising edge of the raw pressure signal, which edge corresponds to the start of combustion, at the time t=0.015 s in FIGS. 6 and 7. Precise determination of the start of combustion can therefore be achieved on the basis of the filtered pressure signal as generated by the method according to the invention.

Using the derivative dP/dt of the filtered pressure signal and/or the filtered pressure signal itself it is possible in particular to determine one or more characteristic parameters of the combustion, particularly parameters that can be used for feedback control of the combustion in the engine.

For example, the apparent energy release dQ/dt is determined using the relationship:

$$\left.\frac{dQ}{dt}\right|_t = \frac{1}{\gamma - 1} V(t) \left.\frac{dP}{dt}\right|_t + \frac{\gamma}{\gamma - 1} P(t) \left.\frac{dV}{dt}\right|_t \quad (1)$$

already described.

The start-of-combustion time t0 is, for example, given by the following formula: to such that $$\frac{dQ}{dt}\bigg|_{t0} > St0 \quad\quad 5$$

where St0 is a predetermined threshold.

The power of the acoustic emissions of the engine is, for its part, determined directly from the derivative of the filtered pressure signal dP/dt.

Input into the control unit 600 are both a setpoint signal or vector $y_r$ and a feedback signal or vector x generated by the filtering device 603 according to the invention, that is to say the signal P of FIG. 2a or $P_{out}$ of FIG. 2b according to the embodiment chosen. The setpoint vector $y_r$ for example comprises a setpoint value of the engine power and a setpoint value of the power of acoustic emissions. The setpoint values are preferably mean values established for one thermodynamic cycle or established over several cycles. The feedback vector x comprises for example the instantaneous value of the filtered pressure p filtered by the filtering device according to the invention and the derivative dP/dt of this pressure value, which are data items on the basis of which a true engine power value and a true value for the power of acoustic emissions can be determined so that these can be compared against the corresponding values in the setpoint vector. On the basis of this comparison, the control module 600 can then determine the command to be issued to the engine.

Using the method according to the invention that allows the measured pressure signal measured in the combustion chamber to be filtered, it thus becomes possible precisely and inexpensively to control the combustion phase of the thermodynamic cycle of an engine. When there is only one pressure sensor available for the engine, feedback control will be performed on the basis of the measured pressure signal it provides. In the case of a multi-cylinder engine, and if several sensors are available for detecting the pressure in several of the cylinders, feedback control may be performed taking account of the various measured pressure signals each filtered by the method according to the invention.

The invention claimed is:

1. A device for controlling an internal combustion engine, comprising:
   means for generating a signal for controlling the internal combustion engine;
   a sensor to supply a measured pressure signal for pressure measured in a measured combustion chamber of the internal combustion engine; and
   a filtering device to generate a filtered pressure signal, the filtering device including analog electronic components, wherein the filtering device has a closed-loop configuration with a direct part and a return part, the return part comprising a reinjection module to reinject the filtered pressure signal and the direct part of the closed-loop comprising:
   a first subtractor module generating a difference between the measured pressure signal and an output from the reinjection module,
   a nonlinear module at the output side of the first subtractor module to attenuate low-amplitude fluctuations contained in an output of the first subtractor module, and
   an integrator module generating the filtered pressure signal by integrating an output of the nonlinear module.

2. The device as claimed in claim 1, wherein the first subtractor module, the nonlinear module, and the integrator module are connected in series in the direct part of the closed-loop.

3. The device as claimed in claim 1, further comprising:
   a second subtractor module generating a difference between the measured pressure signal and the filtered pressure signal,
   a low-pass filtering module at an output side of the second subtractor module, and
   an adder module generating a corrected filtered pressure signal in a form of a sum of the filtered pressure signal and an output from the low-pass filtering module.

4. The device as claimed in claim 1, wherein a signal input into the integrator module is, disregarding a gain factor, a signal corresponding to a derivative with respect to time of the filtered pressure signal.

5. The device as claimed in claim 1, further comprising at least one multiplier module to adjust gain applied to the filtered pressure signal before the filtered pressure signal is reinjected.

6. The device as claimed in claim 1, wherein the nonlinear module performs a soft or hard thresholding function.

7. The device as claimed in claim 1, wherein the nonlinear module includes at least one resistor and at least two diodes that are connected back-to-back and in parallel.

8. The device as claimed in claim 3, wherein the first subtractor module or the second subtractor module or the adder module includes an operational amplifier and at least one resistor.

9. The device as claimed in claim 1, wherein the integrator module includes at least one resistor and one capacitor.

10. The device as claimed in claim 3, wherein the low-pass filtering module includes at least one resistor and one capacitor.

11. The device as claimed in claim 1, wherein the means for generating a signal is an engine control unit.

* * * * *